US011290512B2

(12) United States Patent
Beattie, Jr. et al.

(10) Patent No.: US 11,290,512 B2
(45) Date of Patent: *Mar. 29, 2022

(54) CODEC SELECTION FOR END-TO-END COMMUNICATION WITHOUT INTERMEDIATE TRANSCODING

(71) Applicant: AT&T Intellectual Property I, L.P., Atlanta, GA (US)

(72) Inventors: James Gordon Beattie, Jr., Bergenfield, NJ (US); Jeffrey A. Krinsky, Woodinville, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/940,332

(22) Filed: Jul. 27, 2020

(65) Prior Publication Data

US 2020/0358837 A1 Nov. 12, 2020

Related U.S. Application Data

(63) Continuation of application No. 15/832,308, filed on Dec. 5, 2017, now Pat. No. 10,728,303.

(51) Int. Cl.
| | | |
|---|---|---|
| *H04L 29/06* | (2006.01) | |
| *H04L 65/60* | (2022.01) | |
| *H04L 65/611* | (2022.01) | |
| *H04M 7/00* | (2006.01) | |
| *H04N 7/14* | (2006.01) | |
| *H04L 65/1023* | (2022.01) | |

(Continued)

(52) U.S. Cl.
CPC ........ *H04L 65/607* (2013.01); *H04L 65/1026* (2013.01); *H04L 65/4076* (2013.01);
(Continued)

(58) Field of Classification Search
CPC ............ H04L 65/1006; H04L 65/1026; H04L 65/4076; H04L 65/605; H04L 65/607; H04L 65/403; H04L 65/602; H04L 65/60; H04L 41/32; H04M 7/006; H04M 7/0072; H04N 7/147; H04N 21/25833; H04N 21/25858; H04N 21/2662; H04N 21/41407; H04N 21/4223; H04N 21/6131; H04N 21/234309; H04N 7/17318; G09G 5/005; G09G 5/006
See application file for complete search history.

(56) References Cited

U.S. PATENT DOCUMENTS

8,913,524 B1 12/2014 Aksu
9,008,580 B2 4/2015 Kumar
(Continued)

*Primary Examiner* — Le H Luu (57) ABSTRACT

In one example, the present disclosure describes a device, computer-readable medium, and method for improving media quality at the network edge by encoding the media into a digital stream that is carried, end-to-end, to a peer edge device. For instance, in one example, a method includes initiating, by a first computing device, a connection to a second computing device, selecting, by the first computing device, a codec for encoding data into a data stream, wherein the codec is selected such that the data stream can be decoded by the second computing device without being transcoded by an intermediary, encoding, by the first computing device, the data into the data stream using the codec, and sending, by the first computing device, the data stream to the second computing device.

20 Claims, 3 Drawing Sheets

(51) Int. Cl.
  *H04N 21/61* (2011.01)
  *H04L 65/10* (2022.01)
  *H04N 21/4223* (2011.01)
  *H04N 21/2662* (2011.01)
  *H04N 21/258* (2011.01)
  *H04N 21/414* (2011.01)

(52) U.S. Cl.
  CPC ........ *H04L 65/605* (2013.01); *H04M 7/0072* (2013.01); *H04N 7/147* (2013.01); *H04L 65/1006* (2013.01); *H04M 7/006* (2013.01); *H04N 21/25833* (2013.01); *H04N 21/25858* (2013.01); *H04N 21/2662* (2013.01); *H04N 21/41407* (2013.01); *H04N 21/4223* (2013.01); *H04N 21/6131* (2013.01)

(56) References Cited

U.S. PATENT DOCUMENTS

| | | | |
|---|---|---|---|
| 9,118,934 B2 | 8/2015 | Breau et al. | |
| 9,251,795 B2 | 2/2016 | Patel et al. | |
| 9,401,975 B2 | 7/2016 | Hori et al. | |
| 9,406,252 B2 | 8/2016 | Bennett | |
| 9,667,975 B2 | 5/2017 | Park et al. | |
| 9,729,726 B2 | 8/2017 | Li et al. | |
| 9,819,973 B2 | 11/2017 | Allen et al. | |
| 9,826,072 B1 | 11/2017 | Filart et al. | |
| 2007/0140116 A1 | 6/2007 | Vega-Garcia | |
| 2012/0297021 A1* | 11/2012 | Channabasavaiah | H04N 21/6581 709/217 |
| 2016/0343346 A1* | 11/2016 | Lee | H04L 65/602 |
| 2017/0032762 A1* | 2/2017 | Smadi | H04N 19/70 |
| 2017/0054777 A1* | 2/2017 | Leung | H04M 7/0072 |
| 2017/0099587 A1 | 4/2017 | Patel et al. | |
| 2017/0215052 A1* | 7/2017 | Koum | H04W 4/18 |
| 2017/0230434 A1* | 8/2017 | Wang | H04L 69/18 |
| 2017/0303114 A1 | 10/2017 | Johansson et al. | |
| 2018/0255329 A1* | 9/2018 | Gonzalez-Banos | H04N 21/8456 |
| 2018/0324235 A1* | 11/2018 | Mufti | H04L 65/103 |
| 2019/0116017 A1* | 4/2019 | Petruzzelli | H04N 21/4622 |

* cited by examiner

CODEC SELECTION FOR END-TO-END COMMUNICATION WITHOUT INTERMEDIATE TRANSCODING

This application is a continuation of U.S. patent application Ser. No. 15/832,308, filed on Dec. 5, 2017, now U.S. Pat. No. 10,728,303, which is herein incorporated by reference in its entirety.

The present disclosure relates generally to digital media distribution, and relates more particularly to devices, non-transitory computer-readable media, and methods for improving media quality at the network edge by encoding the media into a digital stream that is carried, end-to-end, to a peer edge device.

BACKGROUND

Mobile device users often pair other wireless electronic devices, such as Bluetooth headsets, speakers, cameras, fitness trackers, and wearable smart devices, with their mobile devices. For instance, when placing a call to a receiver's mobile phone, call data may be sent in a digital data stream from the sender's paired headset to his mobile phone, reduced to baseband audio and/or video, and then re-encoded for transmission over a cellular packet network. Subsequently, if the sender's and receiver's networks and/or mobile phone(s) are not compatible, then the digital data stream is transcoded (i.e., converted from one file format to another), sometimes via baseband, and then the transcoded digital data stream is forwarded to the receiver's mobile phone. The receiver's mobile phone may then extract the call data from the digital stream and encode the call data for use across the receiver's paired devices.

SUMMARY

In one example, the present disclosure describes a device, computer-readable medium, and method for improving media quality at the network edge by encoding the media into a digital stream that is carried, end-to-end, to a peer edge device. For instance, in one example, a method includes initiating, by a first computing device, a connection to a second computing device, selecting, by the first computing device, a codec for encoding data into a data stream, wherein the codec is selected such that the data stream can be decoded by the second computing device without being transcoded by an intermediary, encoding, by the first computing device, the data into the data stream using the codec, and sending, by the first computing device, the data stream to the second computing device.

In another example, a computer-readable medium stores instructions which, when executed by the processor, cause the processor to perform operations. The operations include initiating, by a first computing device, a connection to a second computing device, selecting, by the first computing device, a codec for encoding data into a data stream, wherein the codec is selected such that the data stream can be decoded by the second computing device without being transcoded by an intermediary, encoding, by the first computing device, the data into the data stream using the codec, and sending, by the first computing device, the data stream to the second computing device.

In another example, a method for improving media quality at the network includes initiating, by a first computing device, a connection to a second computing device, selecting, by the first computing device, a codec for encoding data into a data stream, wherein the codec is selected such that the data stream can be decoded by the second computing device without being transcoded by a lossy transcoder, encoding, by the first computing device, the data into the data stream using the codec, and sending, by the first computing device, the data stream to the second computing device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for improving media quality at the network edge by encoding the media into a digital stream that is carried, end-to-end, to a peer edge device. As discussed above, mobile device users often pair other wireless electronic devices, such as Bluetooth headsets, speakers, cameras, fitness trackers, and wearable smart devices, with their mobile devices in order to consume data. This often necessitates the transcoding—sometimes multiple times—of the data. For instance, even a simple mobile-to-mobile call may require transcoding in the event that the mobile devices use different codecs (e.g., universal mobile telecommunications system (UMTS) to voice over long-term evolution (VoLTE), general packet radio service to VoLTE, etc.). Calls involving additional or different communication devices may require even further transcoding (e.g., satellite phone to UMTS or VoLTE, additional transcoding between mobile devices and paired headsets, between a public switched telephone network (PSTN) and a speaker phone, or between the Internet and a computer phone). Transcoding introduces delay in addition to the normal and expected packet forwarding delays and can also cause a loss of fidelity in the data itself. This results in unsatisfactory customer experience.

Examples of the present disclosure provide for end-to-end encoding and decoding of media at the sending and receiving devices. In one example, the real-world media (e.g., image, video, or audio) is encoded into a digital data stream that is carried, end-to-end, to the receiving edge device without being brought back to baseband, re-encoded into another format, and decoded along the way. Thus, in some examples, encoding and decoding of the digital data stream happens only at the network edge or in the sending and receiving devices. A codec for encoding the digital data stream may be mutually selected by the sending and receiving devices in advance of the exchange of the media. For instance, a codec may be selected at connection setup or may be selected from pre-established profiles that define supported codecs for the sending and receiving devices (and potentially other intermediate devices in the path from the sending device to the receiving device). This eliminates or reduces the need for transcoding (i.e., either no transcoder is used, or a lossless transcoder is used), which in turn will minimize the latency of the resulting connection between the sending and receiving devices as well as minimize the loss of fidelity in the media being exchanged. Thus, the customer experience is improved.

Examples of the present disclosure may improve customer experience in a number of scenarios, including send-and-store and store-and-send communications, point-to-point and point-to-multipoint communications (e.g., push-to-talk communications between multiple parties, n-way conference calls, and the like), and half duplex and full duplex communications and combinations thereof.

Figure 1:
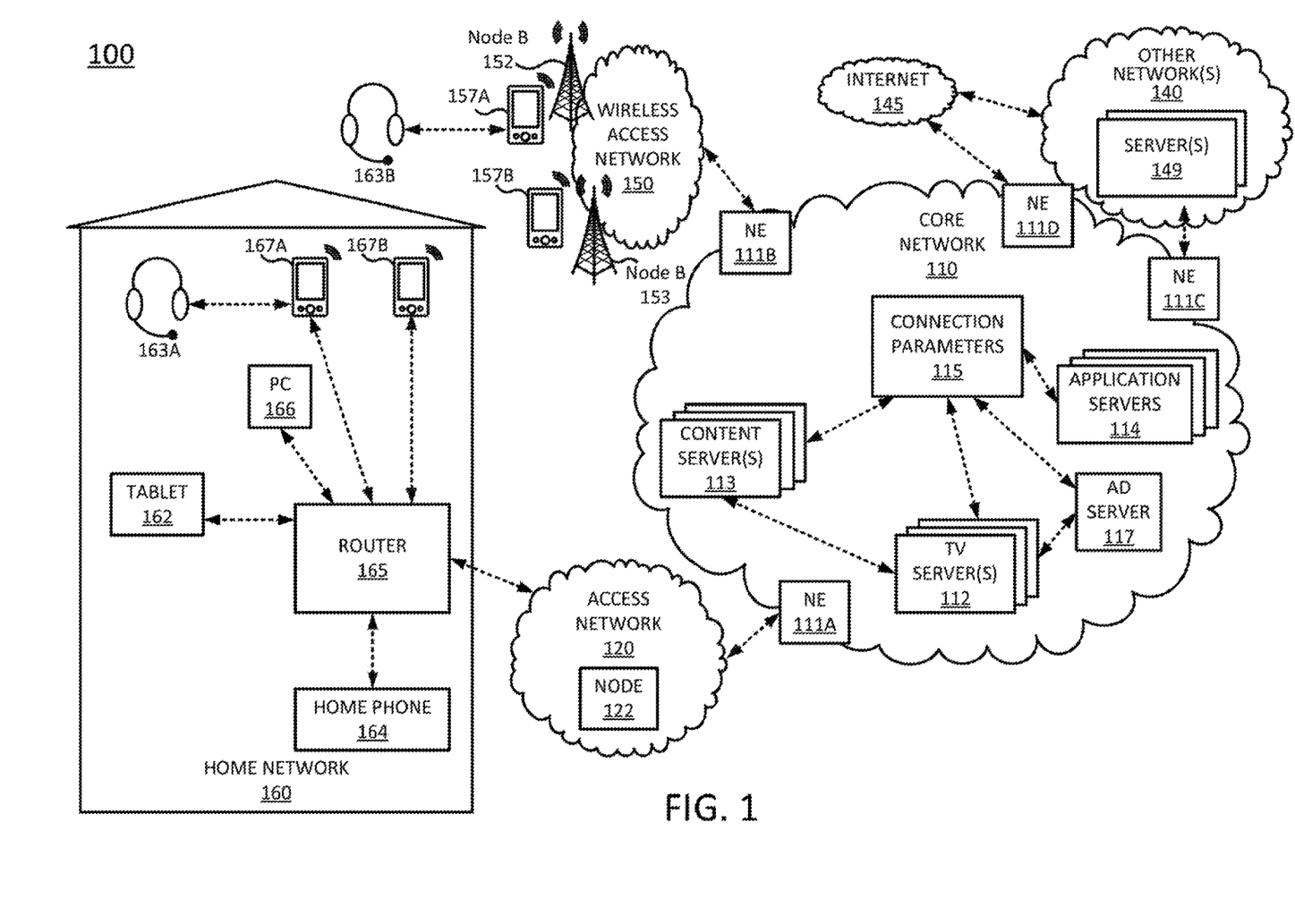
FIG. 1 illustrates an example network, related to the present disclosure.

To better understand the present disclosure, FIG. 1 illustrates an example network 100, related to the present disclosure. As shown in FIG. 1, the network 100 may comprise a content distribution network (e.g., data network) that connects mobile devices 157A, 157B, 167A and 167B, and devices such as router 165, personal computer (PC) 166, tablet computer 162, home phone 164, and paired accessories such as Bluetooth headsets 163A and 163B and so forth, with one another and with various other devices via a core network 110, a wireless access network 150 (e.g., a cellular network), an access network 120, other networks 140 (including additional servers 149) and/or the Internet 145. Mobile devices 157A, 157B, 167A and 167B, and devices such as personal computer (PC) 166, tablet computer 162, home phone 164, and paired accessories such as Bluetooth headsets 163A and 163B may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a digital content distribution application that allows the user of the mobile device to access digital multimedia content such as videos, images, audio, web sites, and the like.

As illustrated in FIG. 1, network 100 includes a core network 110. In one example, core network 110 may combine core network components of a cellular network with components of a triple play or n-play service network; where triple play services include telephone services, Internet services and television services to subscribers, and n-play services may include any one or more of the triple play services plus additional services (e.g., such as security monitoring, health monitoring, geo fencing, and the like). For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. In one example, the network elements 111A-111D comprise repositories of codecs that can be selected by and downloaded to the mobile devices 157A, 157B, 167A and 167B, and devices such as personal computer (PC) 166, tablet computer 162, home phone 164. As shown in FIG. 1, core network 110 may also include a plurality of television (TV) servers 112, a plurality of content servers 113, a plurality of application servers 114, an advertising server (AS) 117, and a repository of connection parameters 115. For ease of illustration, various additional elements of core network 110 are omitted from FIG. 1.

With respect to television service provider functions, core network 110 may include one or more third party television content (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The application server(s) 114 may include lossless transcoders for transcoding data. Within the context of the present disclosure, a "lossless" transcoder is understood to refer to a transcoder that is nearly lossless, or that is lossy but has minimal or limited impact on customer-perceived data quality. In some examples, rather than bypassing a transcoder completely, data being exchanged may be transcoded by a lossless transcoder (but bypass any lossy transcoders).

The repository of connection parameters 115 may store parameters relating to connections between mobile devices 157A, 157B, 167A and 167B, and devices such as personal computer (PC) 166, tablet computer 162, home phone 164. These parameters may include, for example, preferred and/ or supported codecs associated with mobile devices 157A, 157B, 167A and 167B, and devices such as personal computer (PC) 166, tablet computer 162, home phone 164. As discussed in greater detail below, the repository of connection parameters 115 may be consulted during the setup of a connection between devices in order to support end-to-end encoding of exchanged data.

In one example, the access network 120 may comprise a Digital Subscriber Line (DSL) network, a Local Area Network (LAN), a cellular or wireless access network, a $3^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, Internet communications are sent to and received from router 165, which may be capable of both wired and/or wireless communication. In turn, router 165 receives data from and sends data to the appropriate devices, e.g., tablet 162, personal computer (PC) 166, mobile devices 167A, and 167B, and so forth. Each of these devices may be configured to support media content of particular file formats. In one example, router 165 may further communicate with other devices in the home network 160, such as set top boxes, smart televisions, or the like (not shown). In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, mobile device 167A and/or mobile device 167B may be equipped with an application to send control signals to a paired device, such as a headset 163A, via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where the paired device is similarly equipped to receive such a signal.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
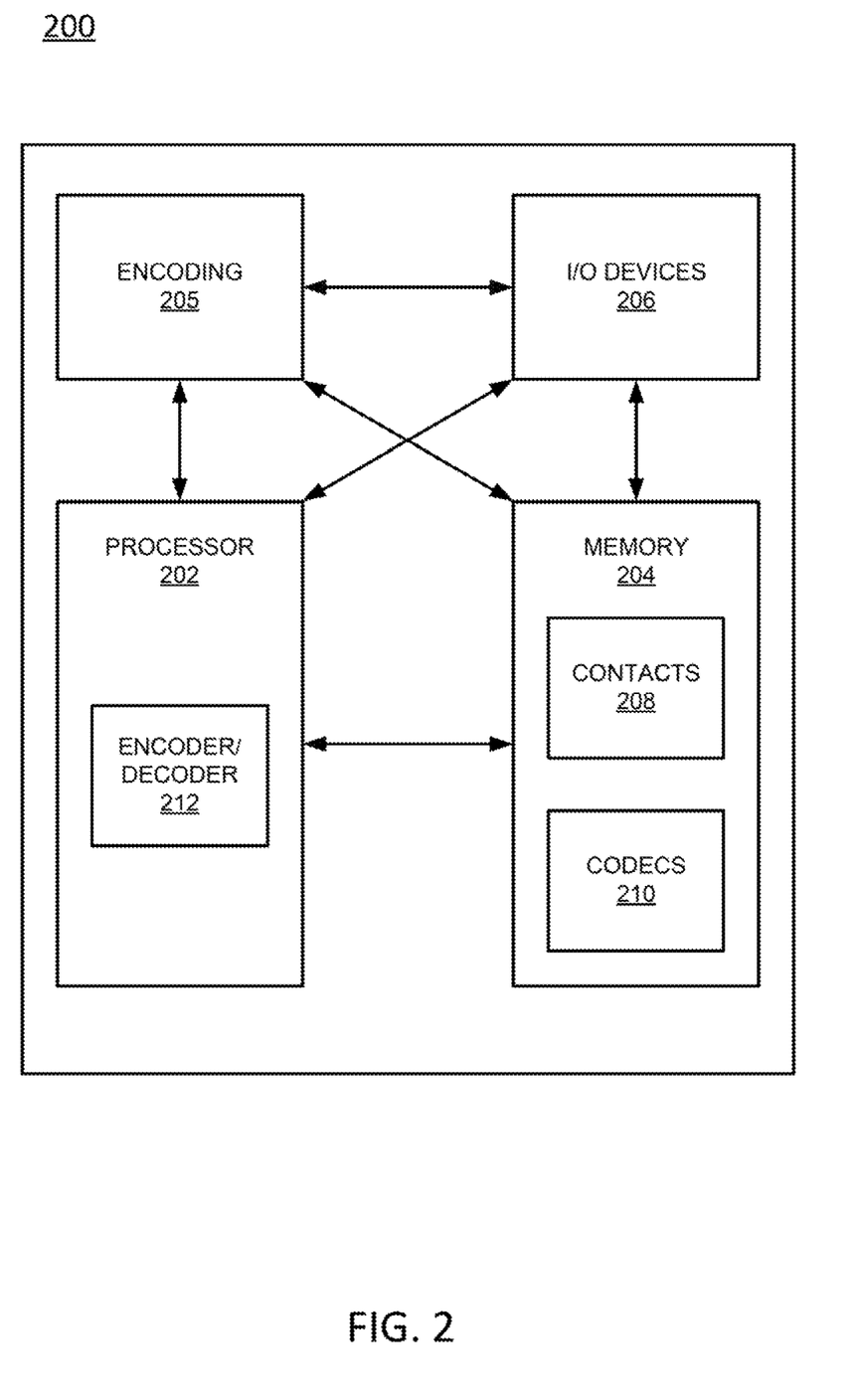
FIG. 2 illustrates a high-level block diagram of an example computing device specifically programmed to support end-to-end encoding of media in a digital stream.

FIG. 2 illustrates a high-level block diagram of an example computing device 200 specifically programmed to support end-to-end encoding of media in a digital stream. For example, any of the mobile devices 157A, 157B, 167A and 167B, and devices such as personal computer (PC) 166, tablet computer 162, home phone 164 illustrated in FIG. 1 may be configured as illustrated in FIG. 2. Alternatively, certain functions of the computing device 200 may be supported across one or more devices in the network 100 of FIG. 1, such as a repository of codecs (e.g., as embodied in network elements 111A-111D) and/or the repository of connection parameters 115.

As depicted in FIG. 2, the system 200 comprises a hardware processor element 202, a memory 204, a module 205 for encoding data into a digital stream, and various input/output (I/O) devices 206.

The hardware processor 202 may comprise, for example, a microprocessor, a central processing unit (CPU), or the like. In one example, the processor 202 may include an encoder/decoder 212 that encodes and decodes data in conjunction with instructions stored by the module 205 for encoding data into a digital stream and codecs stored in the memory 204.

The memory 204 may comprise, for example, volatile and/or non-volatile memory, such as random access memory (RAM), read only memory (ROM), static RAM (SRAM) memory, Flash memory, a disk drive, an optical drive, a magnetic drive, and/or a Universal Serial Bus (USB) drive. In one example, the memory 204 may store a set of contacts 208 and a set of codecs 210. The set of contacts 208 may comprise, for instance, profiles for one or more other devices with which the computing device 200 communicates or has communicated. Each profile may be associated with a different device and may include, for that device, a nickname (e.g., "Mom's cell phone," "James's tablet," etc.), contact information (e.g., mobile phone number, IP address, MAC address, or the like), connection parameters (including, e.g., a list of supported or preferred codecs, connection diagnostics, network(s) likely to be used, accessories or peripherals likely to be used, or other parameters), and/or other information. The set of codecs 210 may comprise one or more permanently and/or temporarily stored codecs that are accessible to the encoder/decoder 212 for encoding and decoding data.

The module 205 for encoding data into a digital stream may include circuitry and/or logic for performing special purpose functions described herein relating to encoding data into a digital stream for end-to-end transmission. The input/ output devices 206 may include, for example, a camera, a video camera, storage devices (including but not limited to, a tape drive, a floppy drive, a hard disk drive or a compact disk drive), a receiver, a transmitter, a display, an output port, a speaker, a microphone, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed below is implemented in a distributed or parallel manner fora particular illustrative example, i.e., the steps of the below method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the below disclosed method(s). In one example, instructions and data for the present module or process 205 for encoding data into a digital stream (e.g., a software program comprising computer-executable instructions) can be loaded into memory 204 and executed by hardware processor element 202 to implement the steps, functions or operations as discussed below in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the below described method(s) can be perceived as a programmed processor or a specialized processor. As such, the present module 205 for encoding data into a digital stream (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Thus, the codecs for end-to-end encoding of data may be stored locally in the customer devices. Two customer devices may negotiate, e.g., during connection setup, a preferred codec to be used for the connection. If one or both of the customer devices does not have the preferred codec stored locally, the preferred codec may be downloaded from a repository in the network (e.g., from one of network elements 111A-111D of FIG. 1). This eliminates or minimizes the need for transcoding of the data on the from the sender to the receiver, thereby minimizing delay and fidelity loss and improving the customer experience. It also minimizes the need for dedicated transcoding infrastructure in the network. Storage of preferred codecs and connection parameters associated with contacts may also accelerate the connection process when two customer devices are setting up a connection (e.g., by allowing the connection to default to the preferred codecs and connection parameters), which further improves the customer experience. Moreover, by sharing a set of codecs among a pool of customers, the operator of the network may save on codec licenses.

The repository of connection parameters 115 illustrated in FIG. 1 may be used in place of or in addition to locally stored profile data to accelerate connections. For instance, as discussed above, a computing device may "remember" the preferred connection parameters and codecs of the other devices with which it has communicated. In one example, however, the repository of connection parameters 115 may pre-emptively load the computing device with the preferred connection parameters and/or codecs or computing devices with which it has not communicated. For instance, if a first computing device often communicates with a set of computing devices that also frequently communicate with a second computing device, the preferred connection parameters and codecs may be pre-emptively loaded to the first computing device in anticipation of a need to communicate with the second computing device (i.e., based on the first computing device and the second computing device having communicated with a common set of contacts/other computing devices). In this case, customers may opt in to share public and/or private information, such as information contained in social media profiles, device address books, and the like.

Figure 3:
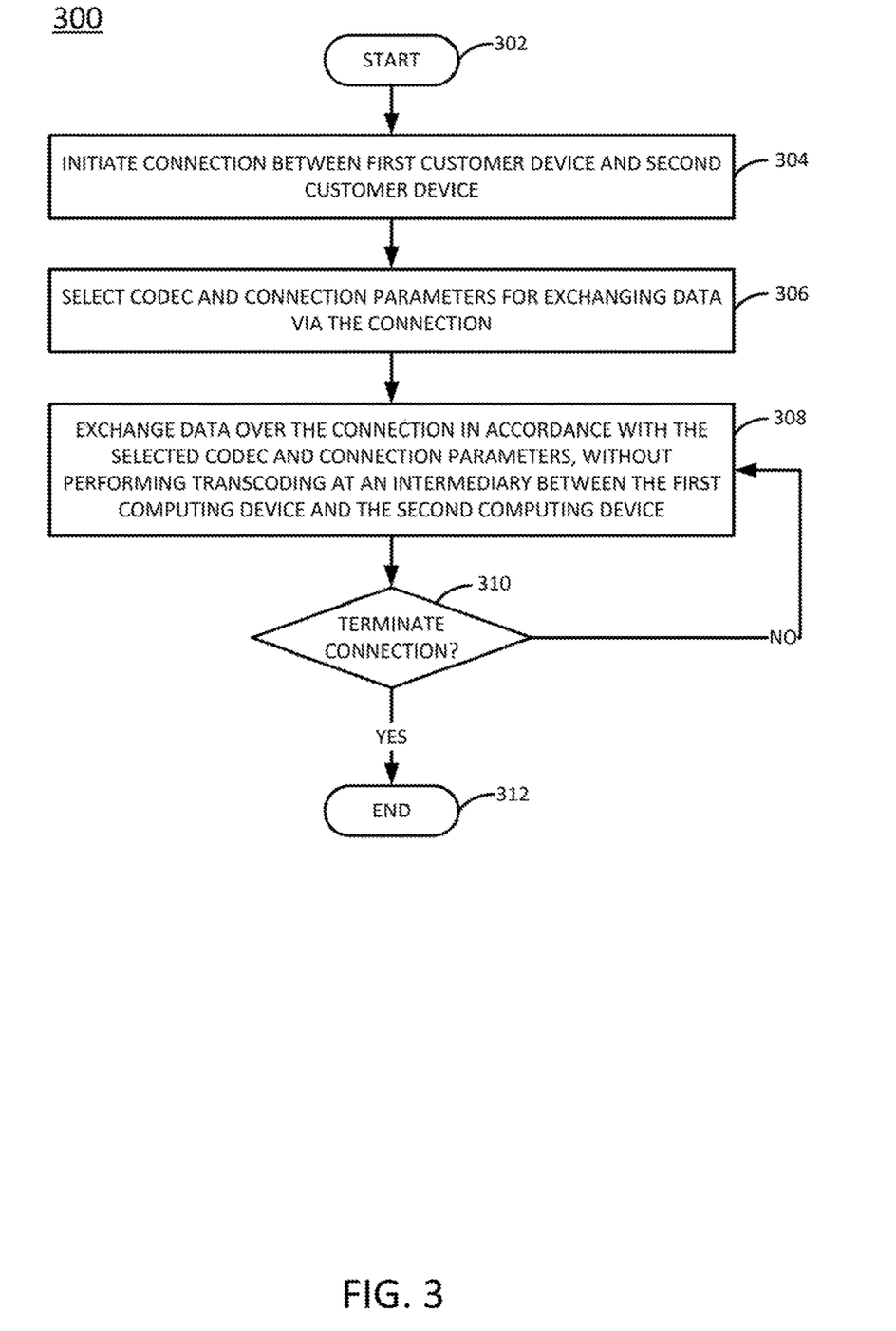
FIG. 3 illustrates a flowchart of an example method for encoding the media into a digital stream that is carried, end-to-end, to a peer edge device.

To further aid in understanding the present disclosure, FIG. 3 illustrates a flowchart of an example method 300 for encoding the media into a digital stream that is carried, end-to-end, to a peer edge device. In one example, the method 300 may be performed by a customer computing device, such as the computing device 200 of FIG. 2. However, in other examples, the method 300 may be performed by another device or devices (e.g., one or more application servers 114 or other device(s)). As such, any references in the discussion of the method 300 to components of FIGS. 1 and/or 2 are not intended to limit the means by which the method 300 may be performed.

The method 300 begins in step 302. In step 304, a connection is initiated between a first computing device and a second computing device (e.g., either of the first computing device or the second computing device may initiate the connection or be the sender). Either or both of the first computing device and the second computing device may comprise, for instance, a mobile phone, a landline phone, a satellite phone, a speaker phone, a computer phone, a tablet computer, a laptop computer, a personal computer, or another type of communication device. Furthermore, one or both of the first computing device and the second computing device may be paired with another wireless device, such as a Bluetooth headset or speaker, a wearable smart device, a fitness tracker, or the like. The first computing device and the second computing device may connect to a core network via the same access network, or via different access networks. For instance, the first computing device may be mobile device 167A of FIG. 1, while the second computing device is mobile device 157A of FIG. 1.

In step 306, a codec for encoding exchanged data via the connection is selected by the first computing device and the second computing device, e.g., as part of the connection setup process. In one example, the computing device initiating the connection (e.g., the sender) may unilaterally select a codec, for example based on a codec that is associated with a profile for the other computing device (e.g., the receiver). For instance, if the first computing device is initiating the connection, the first computing device may select a codec that it used in conjunction with a previous connection to the second computing device (e.g., as indicated in a locally stored profile for the second computing device), or that is associated with the second computing device in a remotely stored repository of connection parameters (e.g., repository of connection parameters 115 of FIG. 1). The second computing device could then opt in to the use of the selected codec as part of the connection setup process. In another example, the selected codec may be mutually negotiated by the first and second computing devices as part of the connection setup process. In another example, the codec may be automatically selected based on an analysis of the profiles of the first and second computing devices (e.g., the codec best-suited for the profiles and/or the aggregate resources across the path between the first and second computing devices may be automatically selected). In one or example, selection of the codec may involve one or both of the first and second computing devices downloading the selected codec from the network (e.g., from one of the network elements 111A-111D of FIG. 1). Additional connection parameters may be selected or negotiated in a similar manner in step 306.

In step 308, the connection between the first computing device and the second computing device is established, based on the codec and connection parameters selected in step 306.

In step 310, data is exchanged over the connection between the first computing device and the second computing device, in accordance with the selected codec and connection parameters. In one example, the exchange of data is performed without performing any transcoding at an intermediary between the first computing device and the second computing device. For instance, the exchange of data in step 310 may involve the first computing device encoding data using the codec selected in step 306 into a digital data stream and sending the digital data stream to the second computing device. The exchange of data in step 310 may further involve the second computing device decoding the digital data stream using the codec selected in step 306 to retrieve the data. In another example, a lossless transcoder performs some amount of transcoding in between the sending of the data and the receipt of the digital data stream, but the digital data stream is exchanged without assistance or transcoding by a lossy transcoder. That is, the lossless transcoder may transcode the digital data stream after it is send by the sender, but before it is received by the receiver.

In step 312, it is determined whether the connection should be terminated. If it is determined in step 312 that the connection should not be terminated, then the method 300 returns to step 310, and the first and second computing devices continue to exchange data using the selected codec. If, however, it is determined in step 312 that the connection should be terminated, then the connection is terminated in step 314. The method 300 then ends in step 316.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   initiating, by a first computing device, a first connection to a second computing device over a communication network via a first path between the first computing device and the second computing device, wherein the first path includes at least one intermediary device;
   selecting, by the first computing device, a first codec for encoding first data into a first data stream, wherein the first codec is selected such that the first data stream can be decoded by the second computing device without being transcoded by the at least one intermediary device in the first path, wherein the selecting the first codec comprises:
      downloading, by the first computing device, the first codec from a remote repository of codecs, wherein the first codec is downloaded to the first computing device based on an observation that the first computing device and the second computing device have previously communicated with each other;
   encoding, by the first computing device, the first data into the first data stream using the first codec; and
   sending, by the first computing device, the first data stream to the second computing device over the first path.

2. The method of claim 1, further comprising:
   initiating, by the first computing device, a second connection to a third computing device over the communication network via a second path between the first computing device and the third computing device, wherein the second path includes at least one intermediary device;
   selecting, by the first computing device, a second codec for encoding second data into a second data stream, wherein the second codec is selected such that the second data stream can be decoded by the third computing device without being transcoded by the at least one intermediary device in the second path, wherein the selecting the second codec comprises:
      consulting, by the first computing device, a profile for the third computing device in a set of contacts stored on the first computing device; and
      retrieving, by the first computing device, the second codec from the profile;
   encoding, by the first computing device, the second data into the second data stream using the second codec; and
   sending, by the first computing device, the second data stream to the third computing device over the second path.

3. The method of claim 2, wherein the second codec is a codec that the first computing device has used in conjunction with a past connection to the third computing device.

4. The method of claim 1, further comprising:
    initiating, by the first computing device, a second connection to a third computing device over the communication network via a second path between the first computing device and the third computing device, wherein the second path includes at least one intermediary device;
    selecting, by the first computing device, a second codec for encoding second data into a second data stream, wherein the second codec is selected such that the second data stream can be decoded by the third computing device without being transcoded by the at least one intermediary device in the second path, wherein the selecting the second codec comprises:
        consulting, by the first computing device, a remote repository of connection parameters for a profile for the third computing device; and
        retrieving, by the first computing device, the second codec from the profile;
    encoding, by the first computing device, the second data into the second data stream using the second codec; and
    sending, by the first computing device, the second data stream to the third computing device over the second path.

5. The method of claim 1, further comprising:
    initiating, by the first computing device, a second connection to a third computing device over the communication network via a second path between the first computing device and the third computing device, wherein the second path includes at least one intermediary device;
    selecting, by the first computing device, a second codec for encoding second data into a second data stream, wherein the second codec is selected such that the second data stream can be decoded by the third computing device without being transcoded by the at least one intermediary device in the second path, wherein the selecting the second codec comprises:
        negotiating, by the first computing device, the second codec with the third computing device;
    encoding, by the first computing device, the second data into the second data stream using the second codec; and
    sending, by the first computing device, the second data stream to the third computing device over the second path.

6. The method of claim 1, wherein the first codec is stored in a set of codecs on the first computing device.

7. The method of claim 1, wherein the remote repository of codecs is stored in a content delivery network to which the first computing device and the second computing device are connected.

8. The method of claim 7, wherein the remote repository of codecs is shared among a pool of customers including an operator of the first computing device and an operator of the second computing device.

9. The method of claim 1, wherein the first codec is selected based upon aggregate resources present across the first path between the first computing device and the second computing device.

10. The method of claim 1, wherein the second computing device opts in to use the first codec prior to the sending.

11. A non-transitory computer-readable medium storing instructions which, when executed by a processor of a first computing device, cause the processor to perform operations, the operations comprising:
    initiating a first connection to a second computing device over a communication network via a first path between the first computing device and the second computing device, wherein the first path includes at least one intermediary device;
    selecting a first codec for encoding first data into a first data stream, wherein the first codec is selected such that the first data stream can be decoded by the second computing device without being transcoded by the at least one intermediary device in the first path, wherein the selecting the first codec comprises:
        downloading the first codec from a remote repository of codecs, wherein the first codec is downloaded to the first computing device based on an observation that the first computing device and the second computing device have previously communicated with each other;
    encoding the first data into the first data stream using the first codec; and
    sending the first data stream to the second computing device over the first path.

12. The non-transitory computer-readable medium of claim 11, the operations further comprising:
    initiating a second connection to a third computing device over the communication network via a second path between the first computing device and the third computing device, wherein the second path includes at least one intermediary device;
    selecting a second codec for encoding second data into a second data stream, wherein the second codec is selected such that the second data stream can be decoded by the third computing device without being transcoded by the at least one intermediary device in the second path, wherein the selecting the second codec comprises:
        consulting a profile for the third computing device in a set of contacts stored on the first computing device; and
        retrieving the second codec from the profile;
    encoding the second data into the second data stream using the second codec; and
    sending the second data stream to the third computing device over the second path.

13. The non-transitory computer-readable medium of claim 12, wherein the second codec is a codec that the first computing device has used in conjunction with a past connection to the third computing device.

14. The non-transitory computer-readable medium of claim 11, the operations further comprising:
    initiating a second connection to a third computing device over the communication network via a second path between the first computing device and the third computing device, wherein the second path includes at least one intermediary device;
    selecting a second codec for encoding second data into a second data stream, wherein the second codec is selected such that the second data stream can be decoded by the third computing device without being transcoded by the at least one intermediary device in the second path, wherein the selecting the second codec comprises:
        consulting a remote repository of connection parameters for a profile for the third computing device; and retrieving the second codec from the profile;

encoding the second data into the second data stream using the second codec; and sending the second data stream to the third computing device over the second path.

15. The non-transitory computer-readable medium of claim 11, wherein the first codec is stored in a set of codecs on the first computing device.

16. The non-transitory computer-readable medium of claim 11, wherein the remote repository of codecs is stored in a content delivery network to which the first computing device and the second computing device are connected.

17. A method comprising:

initiating, by a first computing device, a first connection to a second computing device over a communication network via a first path between the first computing device and the second computing device, wherein the first path includes a lossy transcoder;

selecting, by the first computing device, a first codec for encoding first data into a first data stream, wherein the first codec is selected such that the first data stream can be decoded by the second computing device without being transcoded by the lossy transcoder in the first path, wherein the selecting the first codec comprises:

downloading, by the first computing device, the first codec from a remote repository of codecs, wherein the first codec is downloaded to the first computing device based on an observation that the first computing device and the second computing device have previously communicated with each other; and sending, by the first computing device, the first data stream to the second computing device over the first path.

18. The method of claim 17, wherein the first data stream is transcoded by a lossless transcoder after being sent by the first computing device, but prior to being received by the second computing device.

19. The method of claim 17, further comprising:

initiating, by the first computing device, a second connection to a third computing device over the communication network via a second path between the first computing device and the third computing device, wherein the second path includes a lossy transcoder;

selecting, by the first computing device, a second codec for encoding second data into a second data stream, wherein the second codec is selected such that the second data stream can be decoded by the third computing device without being transcoded by the lossy transcoder in the second path, wherein the selecting the second codec comprises:

consulting, by the first computing device, a profile for the third computing device in a set of contacts stored on the first computing device; and retrieving, by the first computing device, the second codec from the profile;

encoding, by the first computing device, the second data into the second data stream using the second codec; and sending, by the first computing device, the second data stream to the third computing device over the second path.

20. The method of claim 19, wherein the second codec is a codec that the first computing device has used in conjunction with a past connection to the third computing device.

* * * * *